N. North,
Spoke Machine.
Nº 11,677. Patented Sep. 12, 1854.
Fig 1
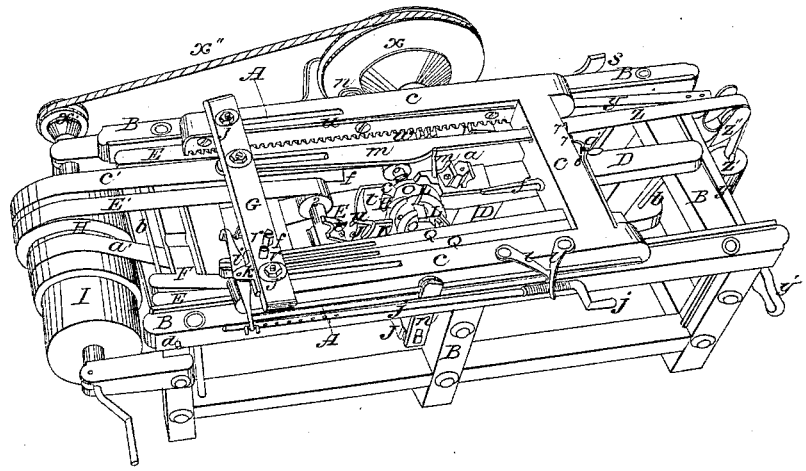
Fig 2
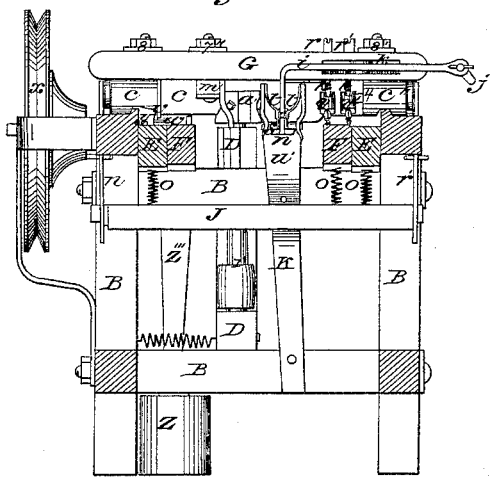
Fig 3
Fig 4
Fig 5  Fig 6  Fig 7
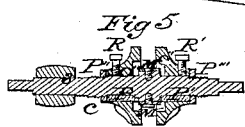 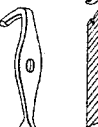
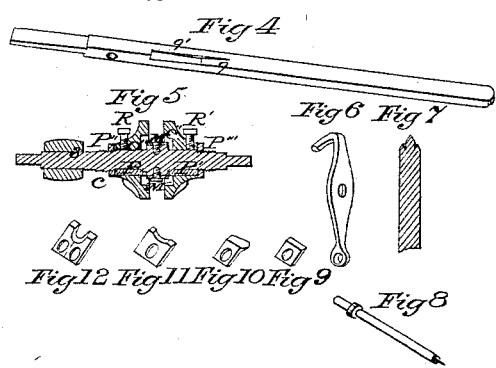
Fig 12 Fig 11 Fig 10 Fig 9
Fig 8

UNITED STATES PATENT OFFICE.

NEWELL NORTH, OF STOW TOWNSHIP, SUMMIT COUNTY, OHIO.

SPOKE-MACHINE.

Specification of Letters Patent No. 11,677, dated September 12, 1854.

*To all whom it may concern:*

Be it known that I, NEWELL NORTH, of the township of Stow, in the county of Summit and State of Ohio, have invented a new and useful Machine for Planing Carriage-Wheel Spokes, (a caveat of which was duly filed in the confidential archives of the Patent Office, bearing date September 5, A. D. 1853,) which I denominate a "Spoke-Planer"; and I do hereby declare that the following is a full, clear, and exact description of the construction and operation of the same, reference being had to the annexed drawings, making a part of this specification in which—

Figure 1 is a perspective view; Fig. 2 is a transverse sectional view through A, A, Fig. 1, with the cutter arbors $e$, $c$, and the belts $a'$, $e'$, $c'$, $x''$, removed, and the carriage C moved back until arrested by the stop 5, against the pin 5'; Fig. 3 a plan of the end of the carriage C, showing the index and pawl $g$, $b$, and the ends of the guides $m$, $a'$; Fig. 4 a perspective view of the guide or inclined plane $a_1$; Fig. 5. a section of the cutter arbor and fixtures C, and Figs. 9 and 10 are perspective views of cutters used in the same; Fig. 11 is a perspective view of a cutter used in the set $a$, and Fig. 12 a cutter used in the set E; Fig. 6 is a perspective view of the lever $i$; Fig. 8 a perspective view of the puppet center $f$, somewhat enlarged, and Fig. 7 is a section of the point of the same still more enlarged, the better to illustrate its construction.

Like characters refer to like parts in all of the drawings.

B, B, etc., is the main frame made of any suitable material, and in any desired form to suit the working parts.

C is the carriage frame, D the swinging frame that supports the set of cutters and arbor $a^1$, and is hinged to the main frame B, by means of the rod $b$. E the swinging frame in one end of which is hung the cutter arbor $c^3$, the opposite end being hinged to the main frame B by means of the rod $d$. The said rod $d$, also hinges the swinging frame F to the main frame B, and in the opposite end of the frame F is hung the set of cutters and arbor $e^2$. Pulleys are seen at 1, 2 and 3, by which their respective arbors are driven. H, the drum that communicates motion to the cutters $e$, $c$, $a$, by means of the belts $e'$, $c'$, $a'$.

I is the pulley to which power is applied to communicate motion to the machine.

$f$, $f'$, are the centers or holders in the carriage C, by which the spoke-timber is held firmly for the action of the cutters. The forked center $f'$, has firmly fastened to its opposite end an index $g$, provided with a cam crank $g'$. The said center is firmly secured to the carriage frame C, by means of a journal bearing; and the puppet center $f$, moves freely through a firm support $h$, that is fastened to the movable or adjustable cross bar G of the carriage; the said center is operated by means of the lever $i$, and the crank and screw rod $j$, the said lever $i$, being fastened to the cross bar G, by means of the fulcrum $k$; and the screw rod $j$, works in a nut $r$, firmly fastened to the frame C.

$m$ is the guide or former which acts upon the swinging frame D, by means of the pin $m'$, guiding the set of cutters $a$; the said pin $m'$, is kept firmly against the face of the former by the action of the helical spring $m''$, Fig. 2, which is firmly fastened to the main frame B, and the swinging frame D.

E, E, Fig. 2, are portions of the swinging frame E, and F, F, are portions of the swinging frame F.

$n$ $n'$ are hangers or fulcra that support the cross bar J, and pass freely through mortises in the main frame B and connect with the friction rollers $^1$, $^{11}$, which bear upon projections of the carriage frame C, holding it firmly on the ways of the main frame B.

$o$ is a helical spring interposed between the bar J and the end of the frame F, near the journal bearing of the cutter arbor $e$; and $o'$, $o''$ are helical springs interposed between the crossbar J, and the end of the swinging frame E, near the journal bearing of the cutter arbor $c$.

$p$, $p'$, are screws that screw into the frame F, E, their heads bearing against the under sides of the guides $a$, $a'$.

K, is a firm support (made in any desirable shape) firmly fastened to the main frame B, and branching into two parts at the top.

$s$, is a pin or wire passing through the prongs of K.

$t$, $t'$, are springs firmly fastened to the top of the prongs of K, by means of rivets, as seen in the drawings; the opposite end of the said springs are forked shaped astride the pin $s$.

$u$, is another spring firmly fastened to the support K, as seen in Fig. 2, and is bent over the pin $s$, between the springs $t$, $t'$, better seen in Fig. 1. Set screws may be attached to regulate the stiffness of the said springs; and india rubber springs or spring levers may be substituted for the springs $t$, $t'$, and $u$, or helical springs properly combined with suitable fixtures.

$v$ is a rack firmly fastened to the frame of the carriage $c$, and $w$ is a pinion fastened to one end of the shaft that supports the grooved wheel $x$, to work in the said rack.

$x'$ is a small grooved pulley fastened to the end of the shaft that supports the drum H.

$x''$, is the round belt or cord that communicates motion to the pulley $x$, and pinion $w$. The pinion shaft has a journal bearing near the pinion $w$, in the end of the lever $y'$, which is fulcrumed to the main frame B, and connecting with the lever $y$.

$z$, $z'$, are a belt and weight, one end of the belt $z$, is firmly attached to the carriage C, the said belt passing over the friction roller $z''$, in the standard $z'''$, and connects with the weight $z'$. The standard $z'''$ is firmly fastened to the main frame B.

4 is a catch and pin to hold the pinion $w$ in gear with the rack $v$, and $4'$, Fig. 3, is a pin for disconnecting said catch when the carriage C, is fed through by the action of the pinion $w$.

5 is a stop fastened to the main frame B, and $5'$ a pin in the carraige C. In operating the machine, the carriage C is moved back until the pin $5'$ comes in contact with the stop 5, by the action of the belt and weight $z$, $z'$, or other means. Then a piece of timber properly prepared is placed between the centers $f$, $f'$, the forked center $f'$, entering the butt or large end of the spoke timber, and the center $f$ entering the small end of the same, and are pressed firmly into it by means of the screw rod and handle $j$ and lever $i'$; the width of the spoke timber being perpendicular to the axis of the cutters $c$ and $e$. Then the pinion $w$, (the machine being in motion) is thrown in gear with the rack $v$, by means of the handle $y$, which feeds the carriage and brings the spoke timber in contact with the cutters $c$, which plane it on two sides and one edge, the surfaces planed being flat and at right angles with each other, and as it progresses it passes between the springs $t$, $t'$, and over the spring $u$ (better seen in Fig. 2). The said springs $t$, $t'$, press firmly against against the sides of the spoke timber, and the spring $u$ presses against the bottom edge of the same, preventing the spoke timber from vibrating during the action of the cutters. The springs $t$, $t'$, and $u$ always have a smooth surface to bear upon the spoke timber, given it by the action of the set of cutters $c$. As the carriage C progresses the spoke timber is brought in contact with the cutters $e$ and $a$, the cutters $a$, not planing the spoke only near the base, the scallop on the side; and the cutters $e$ rounding the spoke, or planing it to an oval shape as far down as it is required to be rounded, and the set of cutters $c$ planing it the whole length when the carriage C is fed through so that the pin $4'$ shall strike the catch 4 and throw the pinion $w$ out of gear with the rack $v$. Then the weight $z'$, will draw the carriage back against the stop 5, as above described; when the spoke is turned half way around by means of the crank $g''$, when the pawl 6, is removed from the index $g$, and is held from turning by means of said index and pawl. The cam crank $g'$, strikes the end of the guide $Q'$, pressing it up near the frame C of the carriage. This being done the pinion $w$ is again thrown in gear with the rack $v$, submitting the spoke timber again to the action of the cutters, which completes the operation, and the spoke is finished, and removed from the machine by turning the handle $j$, in the opposite direction from that turned when the spoke was put in. The index $g$, is not intended to make a whole revolution, but to be turned a half revolution back and forth, a half turn for each spoke planed.

The profile of the former or guide $m$, against which the pin $m'$, moves, is made such shape as to guide the cutters $a$, to cut the scallop on the side of the spoke near the base, the required form. The depth of the cut may be varied by means of the wedges 7, $7'$, and the bolt $7''$, which passes through an elongated hole in the cross bar G. The cutters $e$, $c$, are guided by the inclined planes or guides $a$, $a'$, respectively, and give the taper to the spoke. The taper may be increased by adjusting the guides Q, $Q'$, by turning the screws $r$, $r'$, up or unscrewing them, and vice versa the taper will be diminished.

The set screws $p$, $p'$, are for regulating the cutters $e$ and $c$, to vary the width of the spoke, and also to guide them, as their heads move along the underside of the inclined planes Q, $Q'$. By unscrewing the screws $p$, $p'$, the width of the spoke will be increased, and by screwing them in, it will be diminished. The cross bar G, supporting the puppet center $f$, and the lever $i$, may be adjusted along the carriage frame C, by loosening the nuts of the bolts, 8, $8'$, $7''$, and withdrawing the pins $8'''$ from the screw rod $j$. The cross bar G, may then be moved toward and from the forked center $f'$, to vary the distance between the two centers for the purpose of accommodating them for spokes of different lengths; the bolts and screws 8, 8', 7", $r$, $r'$, pass along in their respective recesses in the carriage frame C, and guides $m$, Q, Q', and the pins 8", may be inserted in any of the holes in the screw rod $j$, to accommodate the position of the bar G.

Fig. 4 is a perspective view of the guide Q', showing the short inclined plane 9, cut in the same, and the hole 9' in the side, for the reception of the spiral spring Q", which is interposed between it and the carriage frame C, as seen in Figs. 2 and 3, for the purpose of pressing the said guide from the said frame toward the guide Q, when the cam index crank $g''$, is in the position seen in the drawings. When a spoke is put into the machine and fed through, when the guide Q' is in the position seen in the drawings, the set screw $r'$, will move along the short inclined plane 9, Fig. 4, and thus the pitch of the tenon on the edge of the butt end of the spoke will be given to it, by the action of the cutters $c$, that plane the said edge of the spoke. And when the spoke is turned by means of the index and crank $g'$, $g''$, as herein above described, the cam crank $g''$, will face the inclined plane Q', up close to the frame C, and then when the carriage is fed through the head of the screw $r$, will move along the straight and plane portion 9', of the inclined plane Q', Fig. 4, and plane the edge of the spoke straight. And when the cam crank $g''$, is turned back again, the helical spring Q" will force the guide Q' in the position seen in the drawings.

L, L, Fig. 1, are the cutter knives that plane the sides of the spoke.

Fig. 10, is a perspective view of the same.

M, M', are the cutters that plane the edge of the spoke, and the figure 9, is a perspective view of the same.

The U or semioval shaped cutter N in the set E, may be cut in or made in two parts to produce the same result in use, if found desirable in practice, as represented by the dotted line in Fig. 12.

$o'$, $o''$, are disks to which the cutters L, L', are fastened; and they are prevented from turning around on the mandrel by means of splines or keys P, P', which are firmly fastened into the mandrels. The said disks may be adjusted to and from each other by means of the nuts P", P'", and held firmly by means of the tightening screws R, R', by which means they may be adjusted to plane spokes of different thicknesses. And to plane spokes of different sizes and shapes, cutters in $e$ and $a$, are used of a size and form to produce the desired pattern.

The sets of cutters $c$ and $e$, by a modification of the construction of the machine, might be made to pass over the top of the carriage C, and produce the same results. But I think the plan adopted above preferable when single sets of cutters are used as above described, rendering it necessary to turn the spoke and submit it a second time to the action of the cutters before it is finished. But I contemplate, and intend to build a machine containing six sets of cutters, instead of three as hereinabove described, with their necessary guides and fixtures, which will be only a multiplication or doubling some of the parts herein above described, with some slight modifications, and additions of some well known devices. The cutters that plane the spoke to a rectangular shape and round it, $c$ and $e$, would in this case be fastened to arbors standing perpendicular to the main frame B, the same as the set $a$; and each set $c$, $e$, being double and in close proximity with each other, would have to be geared together with gearing linked together in such manner that they might approach and recede from each other without the cutting knives clashing with each other, as the cutters on one arbor would, in this way, mash in the spaces between those on the other; that is to say, the double set $c$, would have to be geared together with linked gearing, and the double sets $e$, would have to be geared together with linked gearing for the purpose above mentioned. And the construction of the cutters $c$, would in this case, have to be somewhat modified to suit the case; and the cutters $a$, would have to be driven on arbors horizontal with the main frame B, in a similar manner to the cutters $c$ $e$ as seen in the accompanying drawings; but the arbors would not have to be geared together. And one set would have to pass over the top side of the poppet center $f$, and the other would have to pass under the same, as the carriage C moved forward and back. The cutters being guided by formers, guides, or inclined planes attached to the carriage C, or its equivalent, formed like, or similarly to those herein above described, or in a shape which would be equivalent thereto in producing the desired effect.

By such a double combination of the principles and parts of the machine herein above described, the spoke timber would not have to be submitted to the action of the cutters but once, and consequently would not require the index and pawl $g$, 6, as the spoke would not have to be turned over, it being completed by one movement of the carriage forward and back. In machines having single sets of cutters as represented by the accompanying drawings, and their descriptions, I shall in most cases in practice, use another set of cutters for scalloping the side of the spoke, which will occupy a position in a swinging frame, or its equivalent, by the side of the one D, or near it, which will operate on the opposite side of the center $f'$ from the set $a$. The object of this set of cutters will be to give the spoke a better and more perfect shape. I do not intend to confine myself, in constructing the above described machine, to the exact form and combination of parts as they relate to each other in position, so long as I obtain results by means precisely the same.

The nature of my invention consists in planing spokes longitudinally, by means of three or more sets of revolving cutters, the spoke timber being held by means of centers pressed in each end of the same, one a forked or double center, and the other a puppet center, the said centers being supported in or fastened to a carriage, which moving, brings the timber to form the spoke in contact with the cutters; the said cutters being hung in swinging frames or their equivalents, and the said cutters being guided by means of inclined planes, guides or formers, attached to and moving with the said carriage, to plane the spoke the required taper and form.

What I claim as my invention and desire to secure by Letters Patent, is—

1. The index and cam crank $g$, $g'$, in combination with the forked center or holder $f'$, and the carriage C, or their equivalents, for the purpose set forth.

2. I claim the combination of the handle and rod $j$, and lever $i$, and puppet center $f$, and adjustable cross bar G, and screws $r$, $r'$; the same being combined with the carriage frame C, and guides $m$, Q, Q', as herein above described, for the purpose set forth.

3. I claim the arrangement or relative position of the cutters $e$ and $a$ with respect to the set of cutters $c$, for the purpose set forth.

4. I claim the support or standard K, and springs $t$, $t'$ and $u$, or their equivalents, combined as herein above described and specified, for the purpose set forth.

5. I claim the combination of the set of cutters $c$, or any equivalent combination, for the purpose of planing two sides and one edge of the spoke, with the one and the same set of cutters, as herein above described.

NEWELL NORTH.

Witnesses:
G. W. GOODSELL,
E. W. N. STARR.